(12) United States Patent
Imada

(10) Patent No.: US 8,498,529 B2
(45) Date of Patent: Jul. 30, 2013

(54) INTERCHANGEABLE LENS AND CAMERA SYSTEM HAVING THE SAME

(75) Inventor: Shinji Imada, Saitama (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 13/610,965

(22) Filed: Sep. 12, 2012

(65) Prior Publication Data

US 2013/0071099 A1    Mar. 21, 2013

(30) Foreign Application Priority Data

Sep. 15, 2011 (JP) .................................. 2011-202005

(51) Int. Cl.
*G03B 17/00* (2006.01)

(52) U.S. Cl.
USPC ....................................... 396/55; 348/208.12

(58) Field of Classification Search
USPC .......................................................... 396/55
See application file for complete search history.

(56) References Cited

U.S. PATENT DOCUMENTS

| 5,974,268 A * | 10/1999 | Washisu ......................... 396/55 |
| 2009/0080875 A1* | 3/2009 | Ishikawa et al. ................. 396/55 |
| 2010/0271496 A1* | 10/2010 | Obu ........................... 348/208.4 |

FOREIGN PATENT DOCUMENTS

| JP | 4078292 A | 3/1992 |
| JP | 6067255 A | 3/1994 |
| JP | 2005062242 A | 3/2005 |

* cited by examiner

*Primary Examiner* — Clayton E Laballe
*Assistant Examiner* — Dennis Hancock
(74) *Attorney, Agent, or Firm* — Rossi, Kimms & McDowell LLP

(57) ABSTRACT

An interchangeable lens includes an image stabilizing unit, a position detector configured to detect a position of the correction lens, and a controller configured to set a movable range of the correction lens, when the interchangeable lens is mounted on a first camera body having a function of correcting at least one of a peripheral brightness and an aberration of a picked-up image according to position information of the correction lens, the controller sets the movable range of the correction lens to a first movable range, and when the interchangeable lens is mounted on a second camera body not having a function of correcting the peripheral brightness or the aberration of the picked-up image according to the position information of the correction lens, the controller sets the movable range of the correction lens to a second movable range that is narrower than the first movable range.

5 Claims, 6 Drawing Sheets

INTERCHANGEABLE LENS AND CAMERA
SYSTEM HAVING THE SAME

BACKGROUND OF THE INVENTION

1. Field of the Invention

The present invention relates to an interchangeable lens and a camera system having the same, and in particular relates to image stabilization that corrects an image blur due to a camera shake.

2. Description of the Related Art

Historically, an image stabilizing apparatus that corrects an image blur due to a camera shake is known as an image pickup apparatus, such as a camera. As one embodiment of the image stabilizing apparatus, it is known to correct an image blur by detecting a camera shake and displacing a part of the image pickup optical system (for example, image stabilizing optical system) according to the detected shake. However, when the image stabilizing optical system is displaced, aberration, distortion, or reduction of a peripheral brightness may be caused in a taken image, according to displacement amount, focal distance, or aperture value.

To solve the problem, for example, JPH4-78292 discloses a technology that corrects a chromatic aberration according to displacement amount of an image stabilizing optical system. Moreover, JPH6-67255 discloses a technology to control an aperture value according to a displacement amount of an image stabilizing optical system or to control the displacement amount of the image stabilizing optical system according to the aperture value, so as to prevent reduction of a peripheral brightness when the image blur is corrected. Further, JP2005-62242 discloses a technology to correct reduction of a peripheral brightness according to a displacement amount of an image stabilizing optical system.

However, lens interchange camera systems have the following problems. When the image stabilizing optical system is located in an interchangeable lens side, an image processing correcting unit for correcting the aberration or reduction of a peripheral brightness according to the displacement amount of the image stabilizing optical system may or may not be located in a camera body side on which the interchangeable lens is mounted. If the interchangeable lens corrects the image blur when the mounted camera body does not include the above-mentioned image processing correction unit, the aberration or reduction of the peripheral brightness may be caused according to the displacement amount of the image stabilizing optical system, and an unsightly image is taken. Further, if the mounted camera body includes the above-mentioned image processing correction unit, the displacement amount of the image stabilizing optical system does not need to be limited but is limited, and a camera system incapable of correcting the big shake is used.

SUMMARY OF THE INVENTION

The present invention is intended to perform appropriate image stabilization according to the combination of an interchangeable lens and a camera body.

An interchangeable lens as one aspect of the present invention includes an image stabilizing unit configured to correct an image blur by driving a correction lens, a position detector configured to detect a position of the correction lens, and a controller configured to set a movable range of the correction lens. When the interchangeable lens is mounted on a first camera body having a function of correcting at least one of a peripheral brightness and an aberration of a picked-up image according to position information of the correction lens, the controller sets the movable range of the correction lens to a first movable range, and when the interchangeable lens is mounted on a second camera body not having a function of correcting the peripheral brightness or the aberration of the picked-up image according to the position information of the correction lens, the controller sets the movable range of the correction lens to a second movable range that is narrower than the first movable range.

Further features and aspects of the present invention will become apparent from the following description of exemplary embodiments with reference to the attached drawings.

DESCRIPTION OF THE EMBODIMENTS

Figure 1:
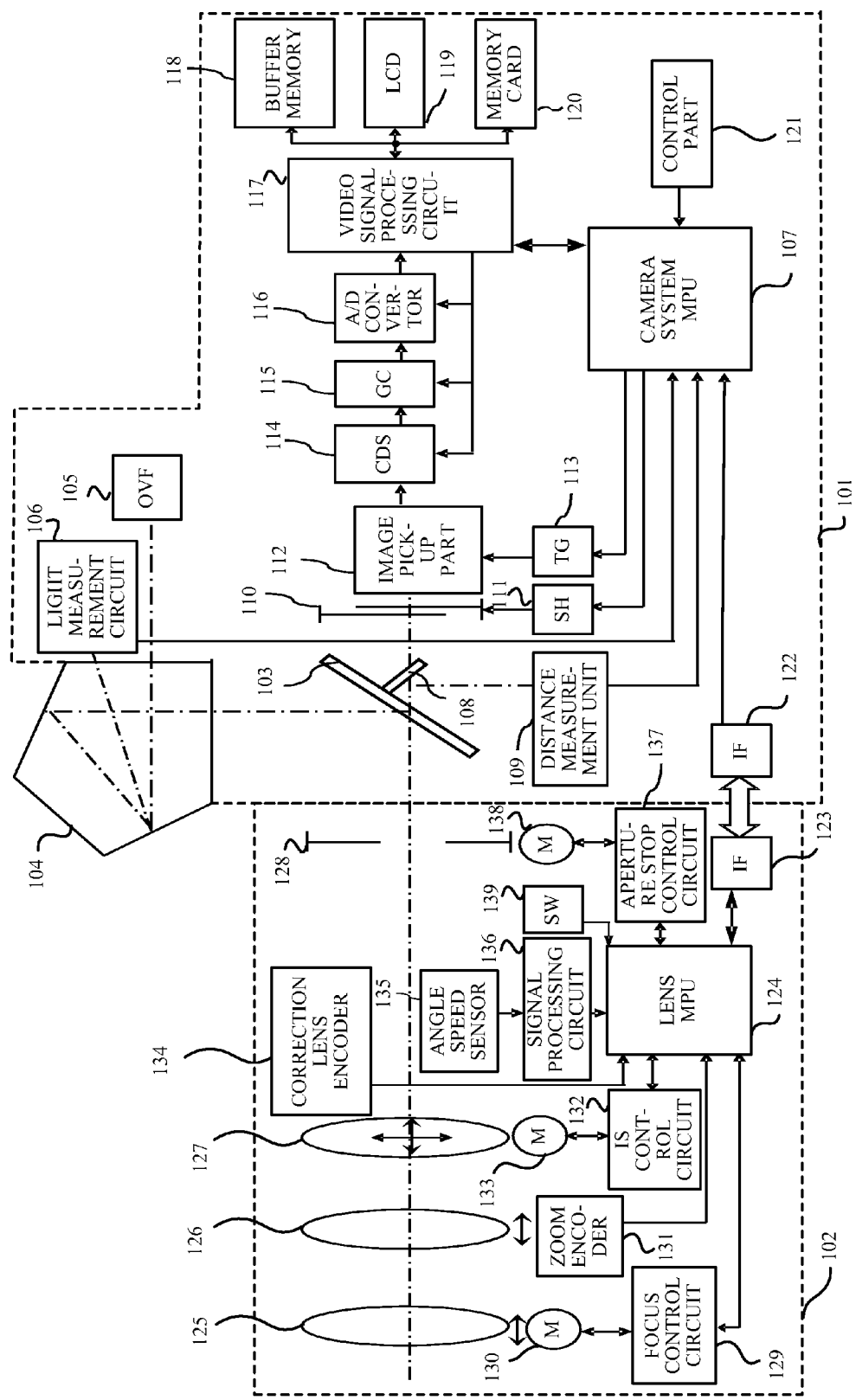
FIG. 1 is a block diagram of a camera system according to a first embodiment.

Referring now to accompanying drawings, a description will be given of embodiments of the present invention. FIG. 1 is a block diagram of a camera system that is related to embodiments of the present invention.

[First Embodiment]

Hereinafter, a camera system according to a first embodiment of the present invention will be described.

FIG. 1 illustrates the configuration of a camera system including a camera body 101 and an interchangeable lens 102. An image pickup light beam from an object passes through an image pickup optical system of the interchangeable lens 102, and is partially reflected on an instant return main mirror 103 having a half mirror in a central part in preparation of taking an image to form an erected image by a penta prism 104. The photographer can find the erected image as an object image in an optical view finder (OVF) 105. Reference numeral 106 denotes a light measurement circuit, and it measures illuminance on a focus plane surface (not illustrated) and inputs a measurement result into the camera system MPU 107. The camera system MPU 107 determines an image pickup condition, such as an exposure time period and an F-number. A light measurement sensor in the light measurement circuit 106 is separated into a plurality of areas, and the light measurement result in each of the areas can be obtained. Reference numeral 108 denotes a sub-mirror, and it is arranged on a back surface of the instant return main mirror 103 and causes a light beam having passed through the half mirror of the instant return main mirror 103 to enter a distance measurement unit 109. The distance measurement unit 109 makes measurement data by performing a photoelectrical conversion of the incident light beam and processing the signal, and inputs it into a camera system MPU 107.

When the preparation of taking an image is changed to an operation of taking an image, the instant return main mirror 103 and the sub-mirror 108 are retracted to the side of the penta prism 104, and a focal plane shutter 110 is driven by a shutter driving circuit 111. As a result, the image pickup light beam is imaged on a surface of an image pickup part 112 (CCD or CMOS) as an image pickup optical image. The image pickup optical image is photoelectrical-converted into an image pickup signal by the image pickup part 112. Reference numeral 113 denotes a timing generator, and it controls an accumulation operation, a readout operation, a reset operation and the like of the image pickup part 112. Reference numeral 114 denotes a CDS circuit (double correlated sampling circuit) that reduces a noise of an accumulated charge of the image pickup part 112, and reference numeral 115 denotes a gain control circuit that amplifies the image pickup signal. Reference numeral 116 denotes an A/D convertor that converts the image pickup signal from an analog into digital image data. Reference numeral 117 denotes a video signal processing circuit, and it performs a filter processing, a color conversion processing and a gamma processing, for image data digitalized by the A/D convertor 116. An image signal processed in the video signal processing circuit 117 is stored into a buffer memory 118, and is displayed on a LCD 119 or is stored into an attachable/removable memory card 120. A control part 121 includes a camera main switch, or switches to perform a setting of an image pickup mode, a setting of the size of the stored image file or a release in taking an image.

The camera system MPU 107 controls the above operations and communicates with a lens MPU 124 via an interface circuit 122 (communication unit) in the side of the camera body 101 and an interface circuit 123 (communication unit) in the side of the interchangeable lens 102. In this communication, a camera focus driving instruction is sent to the interchangeable lens 102, and data, such as optical information and operation state inside the digital camera body 101 or the interchangeable lens 102, is transmitted/received.

In the interchangeable lens 102, a focus lens 125, a zoom lens 126, an image blur correction lens 127 and an aperture stop 128 are placed as parts of the image pickup optical system. The focus lens 125 is driven with a control signal from the lens MPU 124 via a focus control circuit 129 and a focus lens driving motor 130. The focus control circuit 129 includes, in addition to the focus lens driving circuit, a focus encoder or the like that outputs a zone pattern signal or a pulse signal depending on a movement of the focus lens. The object distance can be detected with the focus encoder. The zoom lens 126 moves by a photographer's controlling a zoom control ring (not illustrated). A zoom encoder 131 outputs a zone pattern signal depending on the movement of the zoom lens. The image blur correction lens 127 is driven via an image stabilizing control circuit (IS control circuit) 132 and a linear motor 133. In first embodiment, the image blur correction lens 127, the image stabilizing control circuit 132 and the liner motor 133 configure the image stabilizing corrector. The image stabilization is performed as follows. A shake signal of an angle speed sensor (shake detector) 135 that detects a rotation shake is processed by a signal processing circuit 136 and is input into the lens MPU 124. The lens MPU 124 calculates a correction lens driving target signal, and outputs, to the image stabilizing control circuit 132, a drive signal depending on the difference between the correction lens driving target signal and a position signal of the correction lens that is output from a correction lens encoder (position detector) 134. The image stabilization is performed by feeding back a correction lens position signal (position information) output from the correction lens encoder 134 to the image stabilizing control circuit 132. The aperture stop 128 is driven via an aperture stop control circuit 137 and a stepping motor 138 with a control signal from the lens MPU 124. A switch 139 is for selecting ON/OFF of the image stabilization.

As described above, the camera system MPU 107 and the lens MPU 124 mutually transmits and receives data. In such case, based on the communication data, the mounted digital camera body 101 determines whether to be adapted to an image processing correction, such as a correction of chromatic aberration or a correction of a peripheral brightness, depending on correction lens position information. When the digital camera body 101 is adapted to the above image processing correction (first camera body), the interchangeable lens 102 transmits the position information of the correction lens that is output from the correction lens encoder 134 to the digital camera body 101. The digital camera body 101 performs a correction of chromatic aberration or a correction of a peripheral brightness in the video signal processing circuit 117, according to the received correction lens position information. The correction method has been known in the above-mentioned JPH4-78292 or JP2005-62242, therefore it is omitted. Even if, in this case, the movement amount of the correction lens becomes larger and causes reduction of the peripheral brightness, the interchangeable lens 102 performs the image stabilizing control so as to enlarge a movable range of the correction lens to correct big shakes, because the reduction can be corrected by the image processing. In contrast, in the case that the digital camera body 101 is not adapted to the above image processing correction (second camera body), a small movable range of the correction lens is set to perform the image stabilization because deterioration of an image is caused when the movement amount of the correction lens becomes large.

Figure 2:
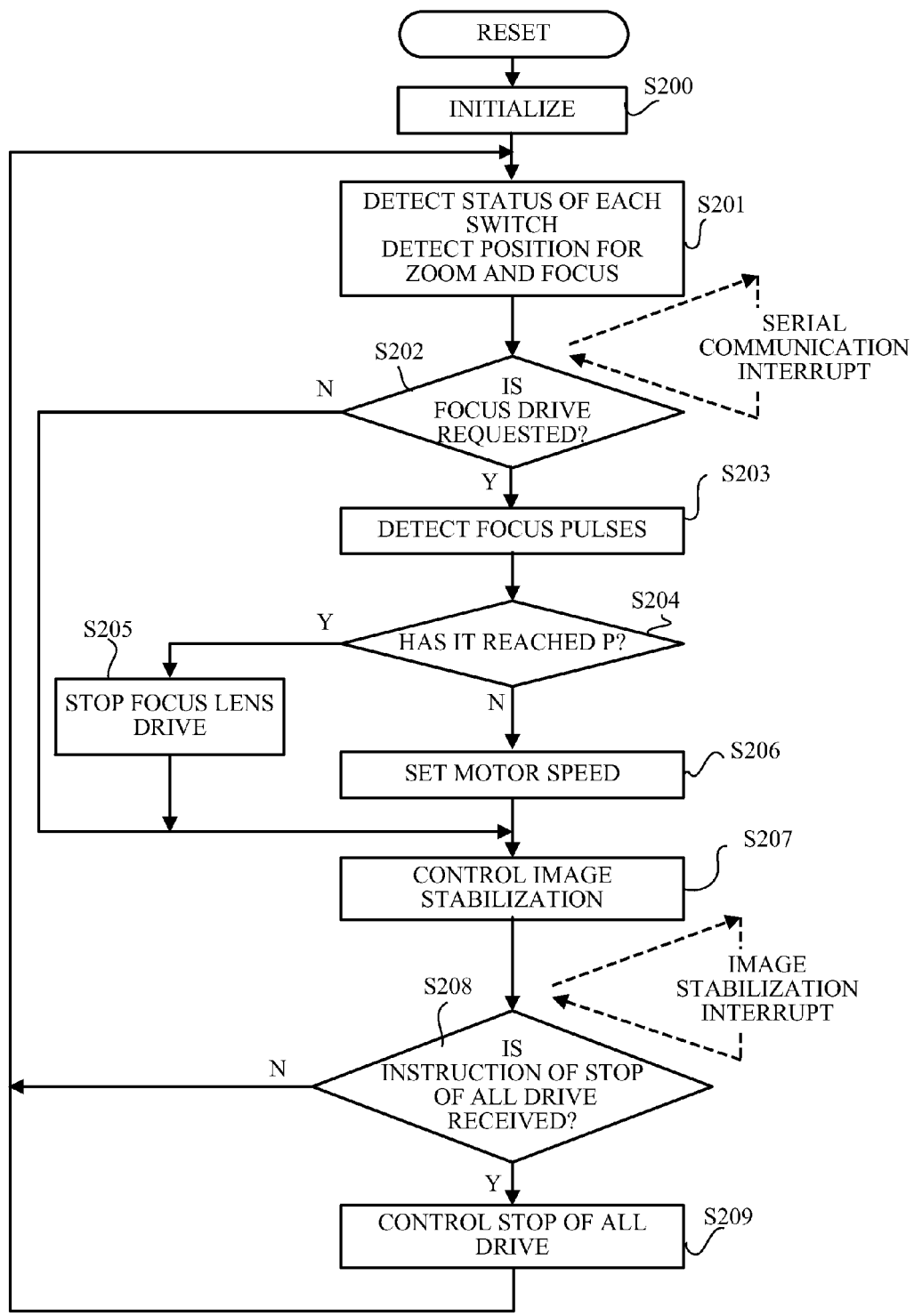
FIG. 2 is a flowchart that illustrates an operation of a lens control according to the first embodiment.

Next, the operation of the interchangeable lens 102 will be described with reference to the flowcharts illustrated in FIGS. 2, 3 and 4. Hereinafter, the interchangeable lens 102 is simply referred to as "lens", and the camera body 101 is referred to as "camera". First, when the lens is mounted on the camera, a serial communication is performed from the camera to the lens, and the lens MPU 124 starts the following operation from step 200 in FIG. 2.

In step 200, an initial setting for lens control and image stabilizing control is performed. In step 201, a status detection of switches and position detection for zoom and focus are performed. The switches include, for example, a switch that switches between an autofocus and a manual focus, a switch 139 for selecting ON/OFF of an image stabilization, and the like. In step 202, it is determined whether a focus driving instruction communication has been performed from the camera. When the focus driving instruction is received, it proceeds to step 203, and when not received, it proceeds to step 207.

In step 203, by the focus driving instruction communication from the camera, a target driving amount (the number of pulses) of the focus lens is also transformed, and the number of pulses from the focus encoder in the focus control circuit 129 is detected. Then, the focus drive is controlled so as to drive it by the target number of pulses. In step 204, it is determined whether it has reached the target number of pulses P. When it has reached the target number of pulses P, it proceeds to step 205, and when it has not reached the target number of pulse P, it proceeds to step 206. In step 205, it has reached the target number of pulses, and the drive of the focus lens is stopped. In step 206, it has not reached the target number of pulses, the speed of the motor 130 for focus lens drive is set according to the remaining number of drive pulses. It is decelerated as the remaining number of drive pulse decreases.

In step 207, if OFF of the switch 139 for selecting ON/OFF of the image stabilization in step 201 is detected, the image blur correction lens 127 is stopped near an optical axis. If ON is detected and ON of a release switch SW1 of the camera is detected in a camera lens status communication, a state capable of operating the image stabilization is set. In step 208, it is determined whether to receive the instruction of stop of all drive (instruction of stopping all drive of actuators in lens) from the camera. If no operation is performed in the camera side, the instruction of stopping all drive is transmitted from the camera after a while. In step 209, the control of stopping all drive is performed. In first embodiment, all actuator drive is stopped, and the lens MPU 124 is set to a sleep (stop) state. A supply to the image stabilizing apparatus is also stopped. Then, when some operations are performed in the camera side, the camera communicates with the lens and the sleep state is awaked. In addition, the control of the aperture stop 128 is also performed, but the explanation is omitted.

When a serial communication interrupt or an image stabilizing control interrupt are required from the camera during these operations, those interrupt processings are performed. In the serial communication interrupt processing, a decoding of communication data is performed, and a lens processing, such as an aperture stop drive and a focus lens drive, is performed according to the decoded result. SW1ON, SW2ON, shutter speed, model of the camera and the like can be also determined by the decoding of the communication data. The image stabilizing interrupt is a timer interrupt that generates every a contact frequency, and an image stabilizing control in a pitch direction (longitudinal direction) and a yaw direction (lateral direction) is performed.

Figure 3:
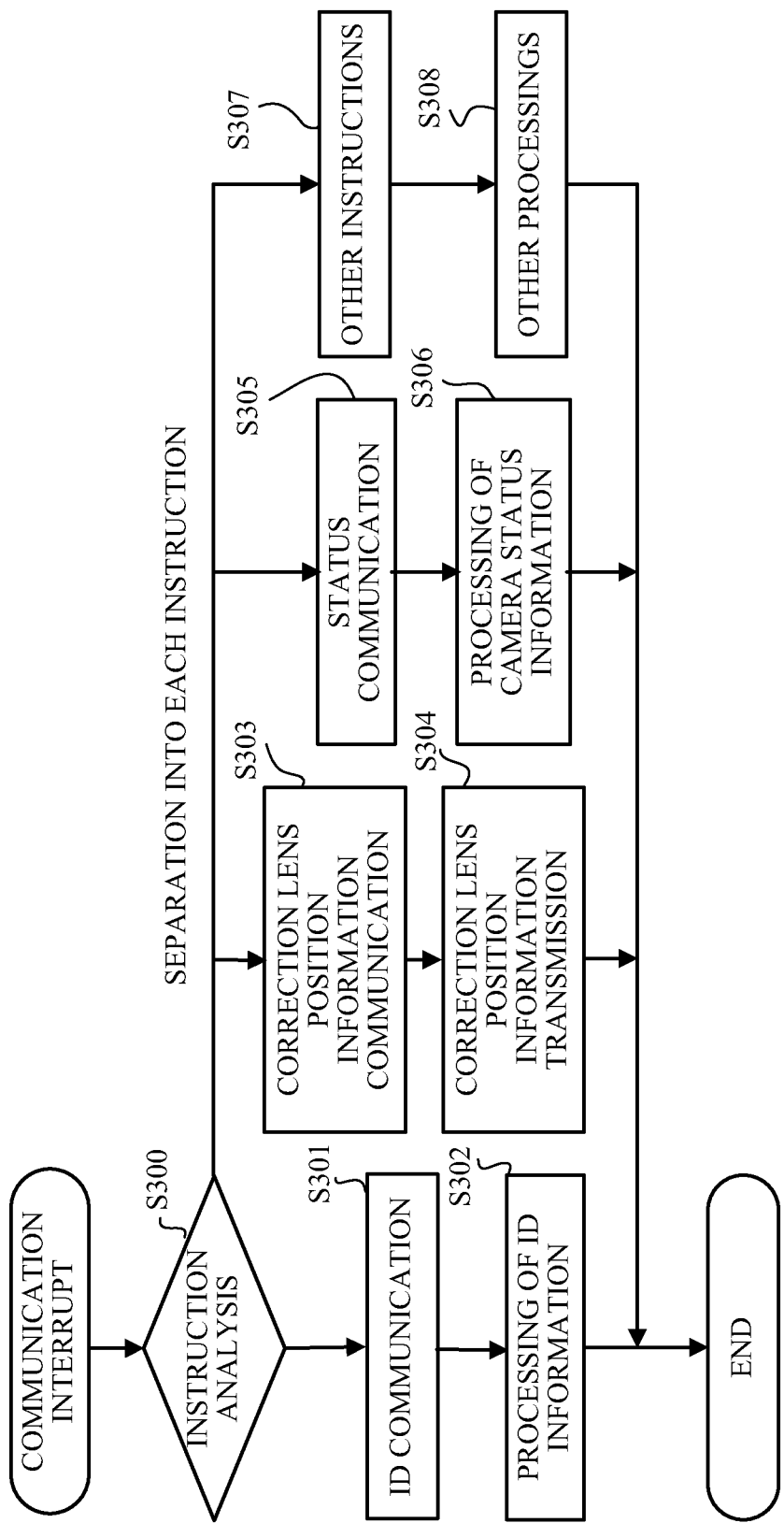
FIG. 3 is a flowchart that illustrates an operation of a camera lens communication according to the first embodiment.

The following explains the serial communication interrupt with reference to the flow chart of FIG. 3. When communication from the camera is received, the lens MPU124 starts after-mentioned operations from step 300.

In step 300, instructions (command) from the camera are analyzed, and one of separated processings is performed according to each of the instructions. For example, ID communication is received in step 301, and in step 302, information regarding models or functions of the camera (camera ID information) is transmitted from the camera to the lens, or information regarding models or functions of the lens (lens ID information) is transmitted from the lens to the camera. For the ID communication, it can be determined whether the camera is adapted to the image processing correction, including the peripheral brightness correction or the aberration correction, depending on the position information of the correction lens. It can be determined whether to be adapted to correction lens position information communication.

In step 303, the correction lens position information communication is received, and in step 304, the correction lens position information communication is transmitted. The camera performs the image processing correction, including the peripheral brightness correction or the aberration correction, based on the correction lens position information.

In step 305, a camera lens status communication is received. In step 306, focal length information, IS operation status or the like of the lens is transmitted to the camera, or a status of the camera (state of release switch, image pickup mode, shutter speed or the like) is received. At this time, it determined whether the camera is preparing of image pickup (SW1 is ON), and if the SW1 is ON, the image stabilizing operation is started.

In step 307, other instructions, including a focus driving instruction or an aperture stop drive instruction, data communication of focus sensitivity of the lens, or optical data communication of the lens, are received. In step 308, these are processed.

The control of the image stabilizing operation is also performed in the lens MPU 124 (controller). The operation will be described with reference to a flowchart in FIG. 4. When there is the image stabilizing interrupt during a main operation of the lens, the lens MPU 124 starts a control of the image stabilization from step 400 in FIG. 4.

In step 400, the A/D conversion is performed for a shake signal (angle speed signal) of a shake detector (angle speed sensor 135). The result of the A/D conversion is stored in a RAM area (not illustrated) set as VAD_DAT in the lens MPU 124. In step 401, it is determined whether the switch 139 for selecting ON/OFF of the image stabilization is ON or OFF. If ON (ISSWON=1), it proceeds to step 402, and if OFF (ISSWON=0), it proceeds to step 403.

In step 402, it is determined whether SW1ON=1 is set, that is to say, whether the release switch of the camera is half-pressed to prepare for taking an image. If SW1ON=1 is set, it proceeds to step 404, and if SW1ON=0 is set (that is to say, the release switch of the camera is not half-pressed), it proceeds to step 403. In step 403, since the image stabilization is not performed, the initialization of integrating calculation due to a high-pass filter is performed. Correction lens drive target data SFTDRV is also set to zero.

In step 404, a high-pass filter calculation is performed. Further, time constant switching is performed during a predetermined time period from the start of the image stabilization to absorb the image shake in initial rise. In step 405, the integrating calculation is performed using the result of the high-pass filter calculation as input. This result is stored in a RAM area (not illustrated) set as DEG_DAT in the lens MPU 124. The DEG_DAT is a deflection change signal. In step 406, the change of the decentering amount (sensitivity) of the image blur correction lens 127 to correct the deflection change DEG_DAT according to the positions of zoom and focus is adjusted. In particular, the zoom and focus positions are each separated into some zones, and an average optical stabilizing sensitivity (deg/mm) in each zone is read out from table data and converted into correction lens drive data. The calculation results are stored in a RAM area (not illustrated) that is set by SFTDR in the lens MPU 124. In step 407, a displacement signal of the image blur correction lens 127 is A/D converted and stored in a RAM area that is set by SFT_AD in the lens MPU 124.

In step 408, it is determined whether the camera is adapted to the image processing correction according to the correction lens position information. This is determined with the ID communication of FIG. 3. If the camera is adapted to the image processing correction, it proceeds to step 409, and if not, it proceeds to step 411. In step 409, the movable range of the correction lens is set as LIMIT_A (first movable range, for example, 1 mm) because the camera is adapted to the image processing correction according to the correction lens position information. It is determined whether the correction lens driving target data SFTDRV is LIMIT_A or more. If it is LIMIT_A or more, it is proceeds to step 410, and if not, it is proceeds to step 413. In step 410, since the correction lens drive target data SFTDERV is LIMIT_A or more, STDRV is rewritten to LIMIT_A. Thereby, the movable range of the correction lens is limited to LIMIT_A.

On the other hand, in step 411, the movable range of the correction lens is set as LIMIT_B (second movable range, for example 0.5 mm) because the camera is not adapted to the image processing correction according to the correction lens position information. It is determined whether the correction lens drive target data SFTDRV is not larger than LIMIT_B. If it is LIMIT_B or more, it proceeds to step 412, and if not, it proceeds to step 413. In step 412, SFTDRV is rewritten to LIMIT_B because the correction lens drive target data SFTDRV is LIMIT_B or more. Thereby, the movable range of the correction lens is limited to LIMIT_B. Accordingly, when the camera does not have a function that performs the image processing correction according to the correction lens position information, the movable range of the correction lens is set narrower than when the camera has the function that performs the image processing correction according the correction lens position information. As a result, the image stabilizing control can be performed so as to correct a larger shake because the movable range of the correction lens is set large when the camera has the function that performs the image processing correction according to the correction lens position information. At this time, even if the movement amount of the correction lens becomes large and the peripheral brightness is reduced, it can be corrected with the image processing. On the other hand, when the camera does not have the function that performs the image processing correction according to the correction lens position information, it can be prevent that, by performing the image stabilization in a state where the movable range of the correction lens is set small, the aberration or the reduction of the peripheral brightness is caused and unsightly image is taken.

In step 413, feedback calculation (SFTDRV−SFTPST) is performed. The calculation result is stored in a RAM area set by SFT_DT in the lens MPU 124. In step 414, a loop gain LPG_DT is multiplied by a calculation result SFT_DT of step 413. The calculation result is stored in a RAM area set by SFT_PWM in the lens MPU 124. Step 415 performs phase compensation calculation (phase lead compensation calculation) to make a stable control system. In step 416, the calculation result of step 415 is output to a port of the lens MPU 124 as PWM, and the image stabilizing interrupt is ended. The output is input to a driver circuit of the IS control circuit 132, the image blur correction lens 127 is driven with the linear motor 133, and the image blur is corrected.

Figure 4:
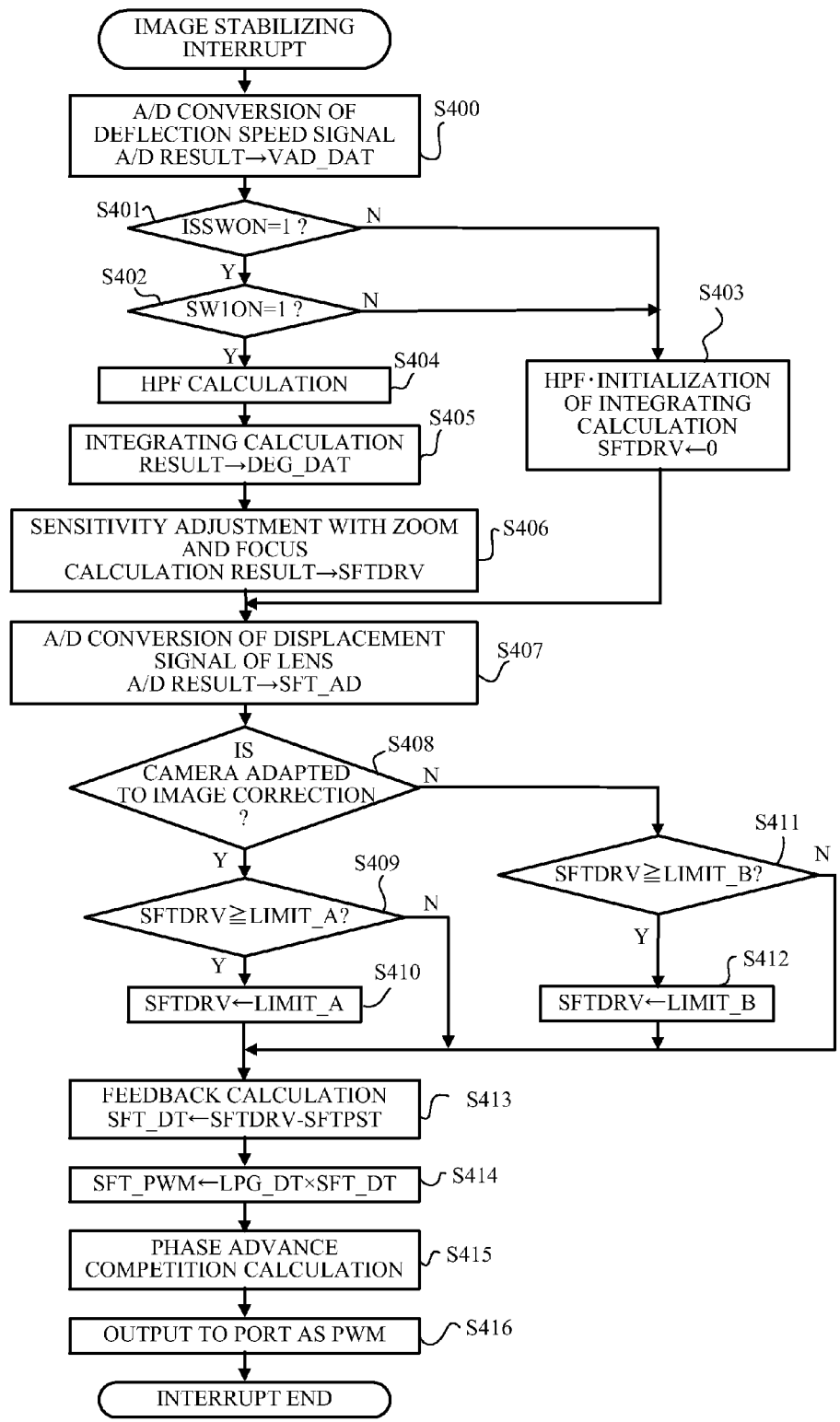
FIG. 4 is a flowchart that illustrates an operation of correcting an image blur according to the first embodiment.

As above, in steps 408 to 412 of FIG. 4, the lens MPU 124 sets the movable range of the correction lens to LIMIT_A or LIMIT_B according to whether the camera is adapted to the image processing correction depending on the correction lens position information. In other words, when the camera is adapted to the image processing correction depending on the correction lens position information, it can be adapted to the correction of large shakes by broadening the movable range of the correction lens. Even if the movement amount of the correction lens becomes large and the image deterioration is caused, the image deterioration is corrected and the good image is taken because the image processing correction depending on the correction lens position information is performed with the camera. Moreover, when the camera is not adapted to the image processing correction depending on the correction lens position information, correction of small shakes is performed by narrowing the movable range of the correction lens. Thereby, it can be prevented that the aberration or reduction of the peripheral brightness is caused and unsightly image is taken. As described above, first embodiment can perform an appropriate image stabilization according to a combination way between interchangeable lens and the camera body (for example, regardless of whether the camera is adapted to the image processing correction depending on the correction lens position information).

[Second Embodiment]

Hereinafter, a camera system in second embodiment of the present invention will be described with reference to FIG. 5. Since the configuration of the camera system is the same as that in FIG. 1, the explanation is omitted.

First, camera lens communication will be described with reference to a flowchart of FIG. 5. The explanation from step 300 to step 308 is omitted because it is the same as that of the flowchart of FIG. 3 of first embodiment. Hereinafter, the explanation of only steps 309 and 310 will be described. Although there is not its figure, it is firstly determined whether a mounted lens is adapted to correction lens movable range information communication in the camera side. In particular, it is determined whether the mounted lens has a communication unit (receiver) to perform movable range information communication of the correction lens. When the camera system MPU 107 determines that the mounted lens is adapted to the movable range information communication of the correction lens, the movable range information communication is performed to the lens. In contrast, when it is determined that the mounted lens is not adapted to the movable range information communication, the movable range information communication is not performed to the lens. In second embodiment, the mounted lens is assumed to be adapted to the movable range information communication of the correction (that is, the mounted lens is assumed to include a communication unit for performing the movable range information communication of the correction lens). Next, in the lens side, since the movable range information communication of the correction lens is received in step 309, the movable range of the correction lens is set to the received data in step 310. If the mounted camera is adapted to the image processing correction according to the correction lens position information, the camera transmits LIMIT_A (for example, 1 mm) to the lens, and if not, the camera transmits LIMIT_B (for example, 0.5 mm) to the lens. The lens sets the received movable range data of the correction lens to LIMIT_C.

Figure 6:
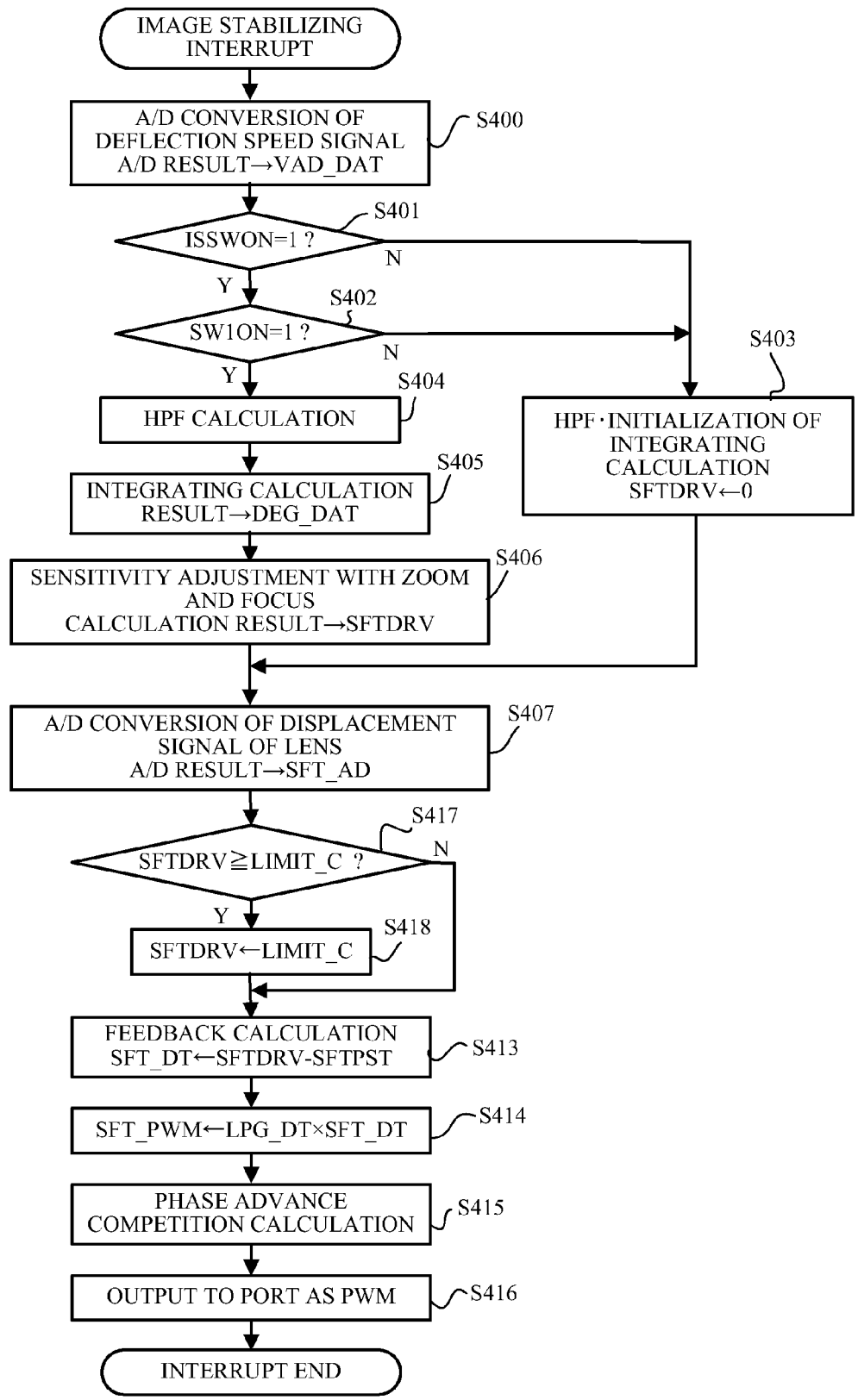
FIG. 6 is a flowchart that illustrates an operation of correcting an image blur according to the second embodiment.

Next, the image stabilizing operation will be described with reference to a flowchart in FIG. 6. An explanation about a part similar to FIG. 4 is omitted, and the operation of second embodiment from step 417 to step 418 will be described.

In step 417, it is determined whether the correction lens drive target data SFTDRV is LIMIT_C or more. LIMIT_C denotes the movable range of the correction lens. If it is LIMIT_C or more, it proceeds to step 418, and if not, it proceeds to step 413. In step 418, the correction lens drive target data SFTDRV is LIMIT_C or more, and therefore the SFTDRV is rewritten to LIMIT_C. As a result, the movable range of the correction lens is limited to LIMIT_C. Data set to LIMIT_C in step 309 and 310 of FIG. 5 becomes LIMIT_A (first movable range) or LIMIT_B (second movable range). In other words, if the camera attached to the lens is adapted to the image processing correction according to the correction lens position information, LIMIT_A (first movable range, for example 1 mm) is set in LIMIT_C. If the camera attached to the lens is not adapted to the image processing correction according to the correction lens position information, LIMIT_B (second movable range, for example 0.5 mm) is set in LIMIT_C.

Figure 5:
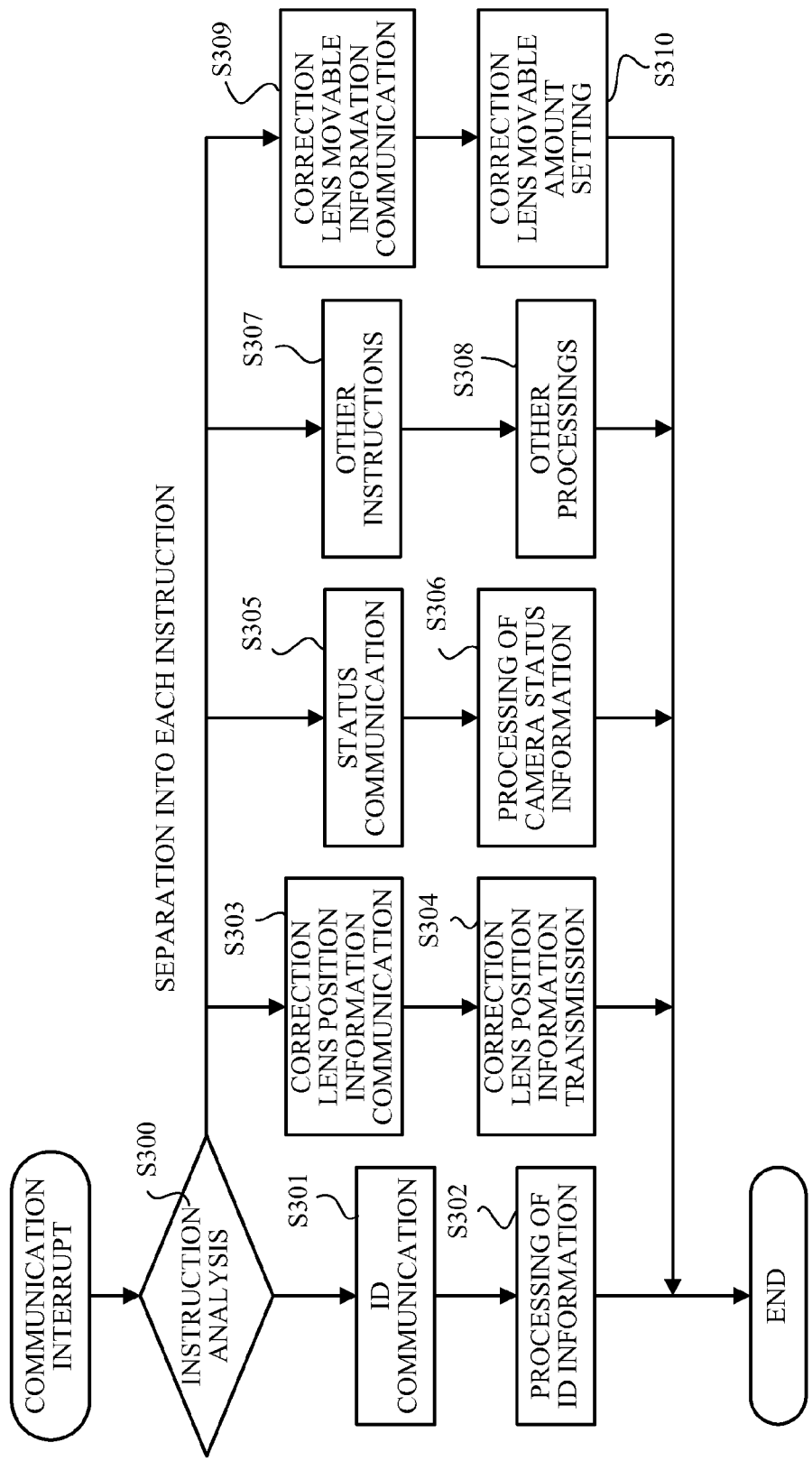
FIG. 5 is a flowchart that illustrates an operation of a camera lens communication according to a second embodiment.

As above, the lens MPU 124 sets the correction lens movable range in steps 309 to 310 of FIG. 5, based on the correction lens movable range data that is transmitted from the camera. If the camera is adapted to the image processing correction according to the correction lens position information, LIMIT_A (first movable range) is transmitted, and therefore the movable range of the correction lens increases and the camera can be adapted to correct large shakes. Even if the movement amount of the correction lens increases and the image deterioration is caused, the image deterioration is corrected to obtain a good image because the image processing correction according to the correction lens position information is performed in the camera. If the camera is not adapted to the image processing correction according to the correction lens position information, LIMI_B (second movable range) is transmitted, the movable range of the correction lens is narrowed, and small shakes are corrected. As a result, it can be prevented that the aberration or reduction of the peripheral brightness is caused and unsightly image is taken. As above, second embodiment can perform an appropriate image stabilization according to the combination of the interchangeable lens and the camera body (for example, regardless of whether the camera is adapted to the image processing correction according to the correction lens position information).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions. For example, while a single reflex camera capable of interchanging lenses has been described in each of the above embodiments, the present invention is adaptable to video cameras capable of interchanging lenses. With regard to a zoom lens, the present invention is allowed to limit the range of the focal length to a predetermined value to be worked.

This application claims the benefit of Japanese Patent Application No. 2011-202005, filed Sep. 15, 2011, which is hereby incorporated by reference herein in its entirety.

What is claimed is:

1. An interchangeable lens detachable from a camera body, the interchangeable lens comprising:
   an image stabilizing unit configured to correct an image blur by driving a correction lens;
   a position detector configured to detect a position of the correction lens; and
   a controller configured to set a movable range of the correction lens,
   wherein,
   when the interchangeable lens is mounted on a first camera body having a function of correcting at least one of a peripheral brightness and an aberration of a picked-up image according to position information of the correction lens, the controller sets the movable range of the correction lens to a first movable range, and
   when the interchangeable lens is mounted on a second camera body not having a function of correcting the peripheral brightness or the aberration of the picked-up image according to the position information of the correction lens, the controller sets the movable range of the correction lens to a second movable range that is narrower than the first movable range.

2. The interchangeable lens according to claim 1, wherein the interchangeable lens includes a communication unit to receive ID information of the camera body, and
   wherein the controller determines whether the interchangeable lens is mounted on the first camera body or the second camera body based on the ID information.

3. The interchangeable lens according to claim 1 wherein the interchangeable lens includes a communication unit to receive movable range data of the correction lens from the camera body, and
   wherein the controller sets the movable range of the correction lens based on the movable range data.

4. A camera system comprising:
   a camera body;
   an interchangeable lens detachable from the camera body,
   wherein the interchangeable lens includes an image stabilizing unit configured to correct an image blur by driving a correction lens;
   a position detector configured to detect a position of the correction lens; and
   a controller configured to set a movable range of the correction lens,
   wherein,
   when the interchangeable lens is mounted on a first camera body having at least one of a function that corrects a peripheral brightness and an aberration of a picked-up image according to position information of the correction lens, the controller sets the movable range of the correction lens in a first movable range, and
   when the interchangeable lens is mounted on a second camera body not having a function that corrects the peripheral brightness or the aberration of the picked-up image according to the position information of the correction lens, the controller sets the movable range of the correction lens in a second movable range that is narrower than the first movable range.

5. The camera system according to claim 4, wherein, when the camera body is the first camera body, the first camera body includes a communication unit configured to communicate position information of the correction lens.

* * * * *